(12) United States Patent
Kimura

(10) Patent No.: US 9,329,624 B2
(45) Date of Patent: May 3, 2016

(54) SYSTEM AND METHOD FOR ACQUIRING AND CORRECTION LIFETIME INFORMATION WITHIN SA INFORMATION WHEN TRANSITIONING BETWEEN POWER MODES

(75) Inventor: Tomohiro Kimura, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 474 days.

(21) Appl. No.: 13/451,731

(22) Filed: Apr. 20, 2012

(65) Prior Publication Data

US 2012/0272082 A1  Oct. 25, 2012

(30) Foreign Application Priority Data

Apr. 20, 2011 (JP) ................................. 2011-093958

(51) Int. Cl.
*G06F 1/32* (2006.01)
*G06F 1/00* (2006.01)
*G06F 1/14* (2006.01)

(52) U.S. Cl.
CPC ................ *G06F 1/14* (2013.01); *G06F 1/3206* (2013.01); *G06F 1/3278* (2013.01); *G06F 1/3293* (2013.01); *Y02B 60/121* (2013.01); *Y02B 60/126* (2013.01)

(58) Field of Classification Search
CPC .................................. G06F 1/14; G06F 1/3293
USPC ........................................................ 713/323
See application file for complete search history.

(56) References Cited

U.S. PATENT DOCUMENTS

| | | | | |
|---|---|---|---|---|
| 2006/0248583 | A1* | 11/2006 | Inoue et al. | 726/14 |
| 2006/0265617 | A1* | 11/2006 | Priborsky | 713/320 |
| 2008/0282082 | A1* | 11/2008 | Uchida | 713/153 |
| 2010/0235500 | A1* | 9/2010 | Shizuno | 709/224 |
| 2010/0235639 | A1* | 9/2010 | Inoue | 713/168 |

FOREIGN PATENT DOCUMENTS

| | | |
|---|---|---|
| JP | 2006259906 A | 9/2006 |
| JP | 2009124542 A | 6/2009 |
| JP | 2010219605 A | 9/2010 |

OTHER PUBLICATIONS

Office Action issued in corresponding Japanese Patent Application No. 2011093958 dated Feb. 17, 2015.

* cited by examiner

*Primary Examiner* — Vincent Tran
*Assistant Examiner* — Robert Cassity
(74) *Attorney, Agent, or Firm* — Rossi, Kimms & McDowell LLP

(57) ABSTRACT

A communication apparatus that is capable of enabling communication even when IPsec life time information is taken over. The communication apparatus is connected to a network via a network interface device and operates in a first power mode or a second power mode with less power consumption. A notification unit notifies the network interface device of IPsec life time information when shifting to the second power mode from the first power mode. A storage unit stores first time information showing time of shifting to the second power mode from the first power mode. An acquisition unit acquires the life time information from the network interface device when shifting to the first power mode from the second power mode. A correction unit corrects the life time information based on second time information showing time of shifting to the first power mode from the second power mode and the first time information.

10 Claims, 10 Drawing Sheets

SYSTEM AND METHOD FOR ACQUIRING AND CORRECTION LIFETIME INFORMATION WITHIN SA INFORMATION WHEN TRANSITIONING BETWEEN POWER MODES

BACKGROUND OF THE INVENTION

1. Field of the Invention

The present invention relates to a communication apparatus communicating with IPsec (Internet Protocol Security), a control method therefor, and a storage medium storing a control program therefor.

2. Description of the Related Art

Conventionally, a power saving mode for reducing power consumption of an information processing system at the time of standby is known. A communication apparatus that comprises a main information processing device with a main CPU and a NIC (Network Interface Card) device with a sub CPU is known as an example of an information processing system with the power saving mode. In general, such a communication apparatus stands by to stop power supply to the main information processing device and to supply regular power to modules of the NIC device that consumes less power.

In relation to this, Japanese Laid-Open Patent Publication (Kokai) No. 2006-259906 (JP 2006-259906A) discloses a technique that the main CPU notifies the sub CPU of an address of a multicast packet that should be responded when shifting to the power saving mode to stop the power supply to the main CPU. Accordingly, since the sub CPU can respond to a received multicast packet instead of the main CPU in the power saving mode, it becomes unnecessary to activate the main CPU. Therefore, the stop period of the power supply to main CPU can be extended, which increases power saving effect.

The encryption technology of the IPsec is known in recent years as a technique that communicates with an encrypted network packet in order to protect confidential information. Use of such techniques enables to transmit and receive encrypted data via a network. This prevents a leak of information. In this case, it is thinkable to take over SA information of the IPsec to the sub CPU from the main CPU when shifting to the power saving mode. This enables that the module of the NIC device communicates by taking over a network session even in the power saving mode.

Thus, when the SA information of the IPsec is taken over to the NIC device at the time of the shift to the power saving mode of the main information processing device, the NIC device can respond to an incoming packet instead of the main information processing device even in the power saving mode.

Life time information of an IPsec session is managed at this time by monitoring residual time and data transfer quantity in the SA information from the time when the connection was established.

However, when the SA information is taken over, unless processing time yielded by the taking over of the SA information between the information processing device and the NIC device is taken into consideration, the life time information of the session cannot be managed accurately and normal IPsec communication may be unable. This processing time includes a period required to transfer the SA information between the information processing device and the NIC device, and a period from the receipt of the SA information by the devices to their actual starts of management using their IPsec modules.

That is, when taking over the SA information from the information processing device to the NIC device, a period from a start to transfer the SA information from the information processing device to the NIC device until the shift to the power saving mode is completed and the IPsec module of the NIC device starts management of the SA information using a timer etc. of the NIC device is not reflected to the life time information of an IPsec session.

In the same manner, when taking over the SA information from the NIC device to the information processing device, a period from a start to transfer the SA information from the NIC device to the information processing device until return from the power saving mode is completed and the IPsec module of the information processing device starts management of the SA information using a timer etc. of the information processing device is not reflected to the life time information of an IPsec session.

Thus, a difference between the proper life time information from the session establishment and the life time information when shifting to the power saving mode increases whenever the shift to the power saving mode and the return from the power saving mode arise. Therefore, when the shift to the power saving mode and the return from that are repeated frequently, the difference becomes large to a minute unit. In such a case, there may be the following problems. That is, a session is not normally completed even if a period shown by life time information expires, and an actual communication is impossible in spite of the fact that a session is in a period in the device itself.

As mentioned above, the prior art may disturb the communication when the life time information is taken over.

SUMMARY OF THE INVENTION

The present invention provides a communication apparatus, a control method therefor, and a storage medium storing a control program therefor, which are capable of enabling communication even when life time information of the IPsec is taken over.

Accordingly, a first aspect of the present invention provides a communication apparatus that is connected to a network via a network interface device and operates in one of a first power mode and a second power mode in which power consumption is smaller than that in the first power mode, comprising a notification unit configured to notify the network interface device of life time information of an IPsec when shifting to the second power mode from the first power mode, a storage unit configured to store first time information that shows time of shifting to the second power mode from the first power mode, an acquisition unit configured to acquire the life time information from the network interface device when shifting to the first power mode from the second power mode, and a correction unit configured to correct the life time information acquired by the acquisition unit based on second time information that shows time of shifting to the first power mode from the second power mode and the first time information that is stored in the storage unit.

Accordingly, a second aspect of the present invention provides a control method for an communication apparatus that is connected to a network via a network interface device and operates in one of a first power mode and a second power mode in which power consumption is smaller than that in the first power mode, the control method comprising a notification step of notifying the network interface device of life time information of an IPsec when shifting to the second power mode from the first power mode, a storing step of storing first time information that shows time of shifting to the second power mode from the first power mode, an acquisition step of acquiring the life time information from the network interface device when shifting to the first power mode from the second power mode, and a correction step of correcting the life time information acquired by the acquisition unit based on second time information that shows time of shifting to the first power mode from the second power mode and the first time information that is stored in the storing step.

Accordingly, a third aspect of the present invention provides a non-transitory computer-readable storage medium storing a control program causing a computer to execute a control method for an communication apparatus that is connected to a network via a network interface device and operates in one of a first power mode and a second power mode in which power consumption is smaller than that in the first power mode, the control method comprising a notification step of notifying the network interface device of life time information of an IPsec when shifting to the second power mode from the first power mode, a storing step of storing first time information that shows time of shifting to the second power mode from the first power mode, an acquisition step of acquiring the life time information from the network interface device when shifting to the first power mode from the second power mode, and a correction step of correcting the life time information acquired by the acquisition unit based on second time information that shows time of shifting to the first power mode from the second power mode and the first time information that is stored in the storing step.

According to the present invention, a communication apparatus, a control method therefor, and a storage medium storing a control program therefor, which are capable of enabling communication even when life time information of the IPsec is taken over, can be provided.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

The IPsec used in this embodiment is a protocol for preventing tapping and alteration of data that flows on a network using a specific authentication algorithm and a cryptographic algorithm. The details of the IPsec and IKE including a packet format are defined in the RFC (Request For Comment).

A first embodiment describes a process when a communication apparatus executes encryption communication, and a second embodiment describes a correction process of life time information (referred to as "life time", hereafter) when there is a connection (SA) between communication apparatuses of the same kind.

Figure 1:
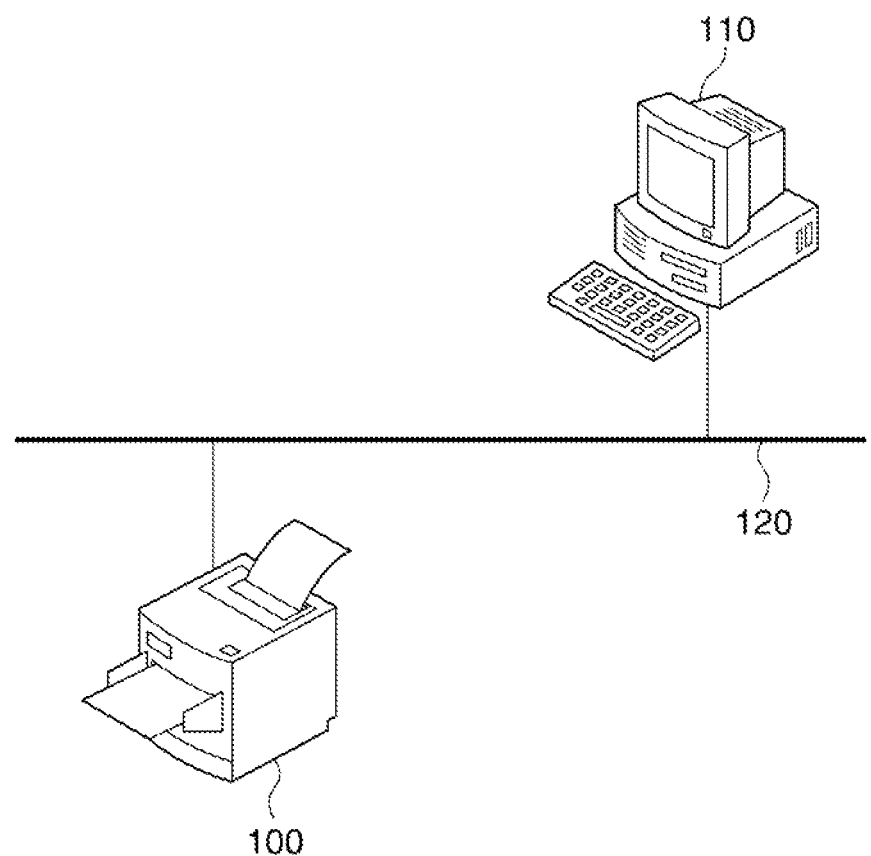
FIG. 1 is a view showing an entire configuration of a network system including a communication apparatus according to a first embodiment of the present invention.

FIG. 1 is a view showing an entire configuration of a network system including a communication apparatus 100 according to the first embodiment of the present invention.

In FIG. 1, the communication apparatus 100 and a PC 110 are connected via a LAN 120 so as to communicate mutually. Each of the communication apparatus 100 and the PC 110 is provided with a configuration for executing IPsec communication, and the IPsec is applied to the entire communication between the communication apparatus 100 and the PC 110.

Figure 2:
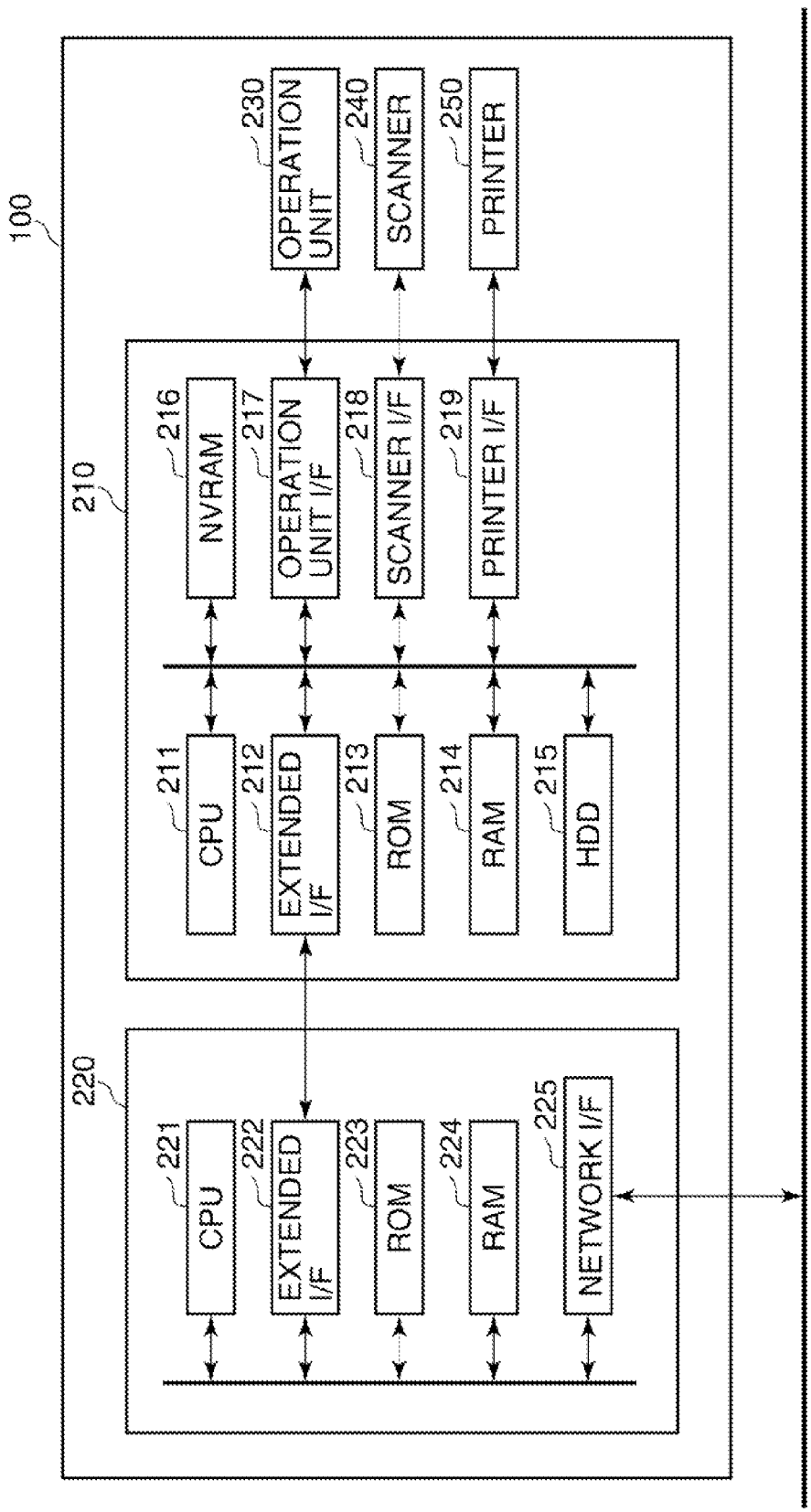
FIG. 2 is a block diagram schematically showing a hardware configuration of the communication apparatus shown in FIG. 1.

FIG. 2 is a block diagram schematically showing a hardware configuration of the communication apparatus 100 shown in FIG. 1.

In FIG. 2, the communication apparatus 100 includes an information processing device (upper device) 210, a NIC (network interface device) 220, an operation unit 230, a scanner 240, and a printer 250. The information processing device 210 is connected to the LAN 120 via the NIC 220.

The information processing device 210 contains a CPU 211, an extended I/F (interface) 212, a ROM (read-only memory) 213, a RAM (random access memory) 214, an HDD (hard disk drive) 215, an NVRAM (nonvolatile memory) 216, an operation unit I/F 217, a scanner I/F 218, and a printer I/F 219.

The CPU 211 executes software programs in the information processing device 210, and controls the entire device. The RAM 214 temporarily stores data when the CPU 211 controls the device. The ROM 213 stores a boot program, fixed parameters, etc. for the device.

The HDD 215 stores various kinds of data. The NVRAM 216 saves various set values of the information processing device 210. The operation unit I/F 217 controls the operation unit 230 operated by a user, displays various operation screens on a liquid crystal panel of the operation unit 230, and transmits instructions from the user inputted through an operation screen to the CPU 211.

The scanner I/F 218 controls the scanner 240. The scanner 240 reads an image on an original and generates image data. The printer I/F 219 controls the printer 250. The printer 250 prints an image based on image data onto a recoding sheet. The extended I/F 212 is connected with an extended I/F 212 of the NIC device 220, and controls data communication with an external apparatus (PC 110) on the LAN 120 via the NIC device 220.

On the other hand, the NIC device 220 includes a CPU 221, the extended I/F 222, a ROM 223, a RAM 224, and a network I/F 225.

The CPU 221 executes a software program of the NIC device 220, and controls the entire NIC device 220. The RAM 224 is a random access memory that temporarily stores data when the CPU 221 controls the NIC device 220. The ROM 223 is a read-only memory that stores a boot program and fixed parameters for the device.

The extended I/F 222 is connected with the extended I/F 212 of the information processing device 210, and controls the data communication between the information processing device 210 and the NIC device 220. The network I/F 225 is connected to the LAN 120, and controls the data communication between the NIC device 220 (the information processing device 210, the communication apparatus 100) and the external apparatus (PC 110) on the LAN 120.

The information processing device 210 operates in either a normal power mode or a power saving mode in which power consumption is smaller than that in the normal power mode. When shifting to power saving mode from the normal power mode, electric power supply to the CPU 211, the HDD 215, the NVRAM 216, etc. is stopped. On the other hand, the NIC device 220 operates on an ACIC (Application Specific Integrated Circuit) that is different from that of the information processing device 210. Therefore, a power supply to the NIC device 220 is continued even in the state where the information processing device 210 shifted to the power saving mode, and a proxy response function mentioned later becomes available.

Figure 3:
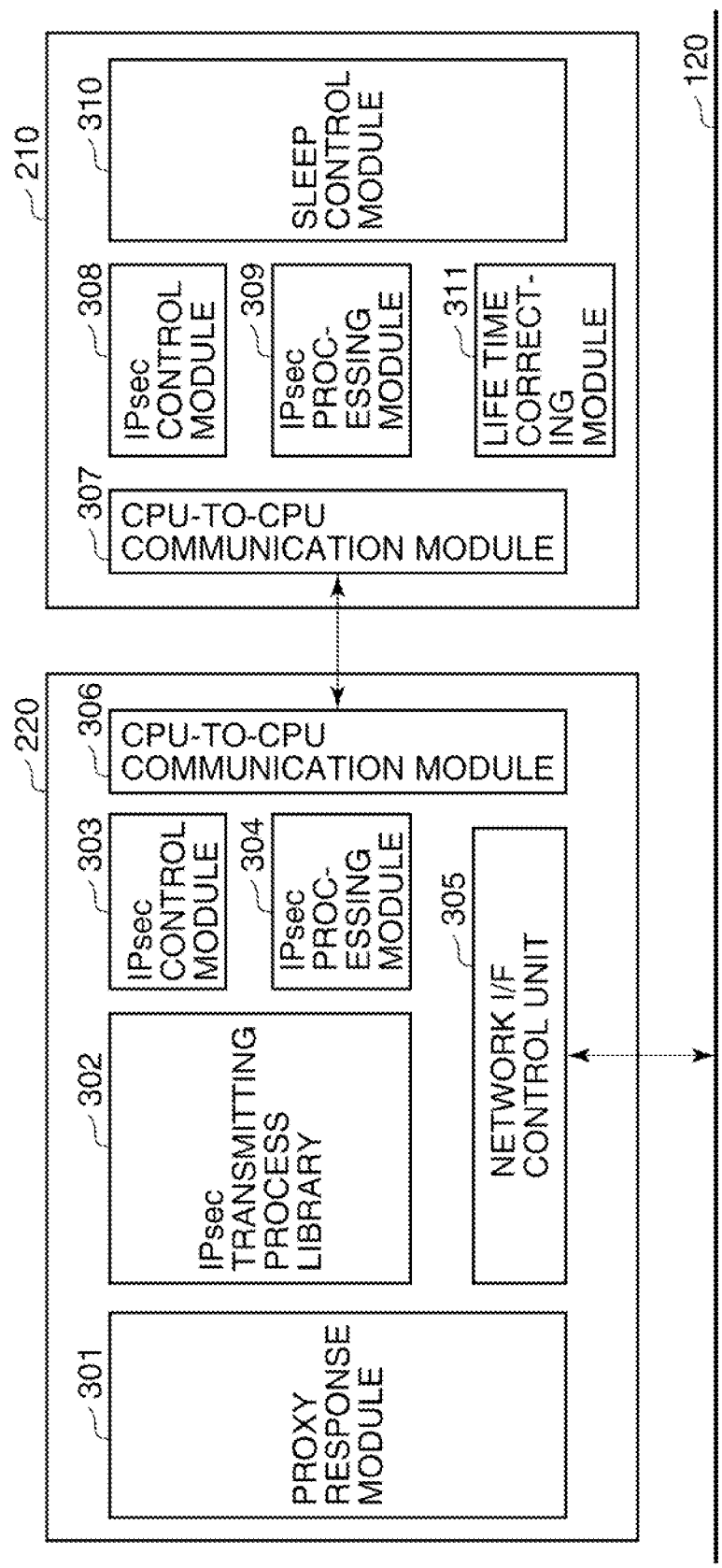
FIG. 3 is a block diagram schematically showing a software configuration of the communication apparatus shown in FIG. 1.

FIG. 3 is a block diagram schematically showing a software configuration of the communication apparatus 100 shown in FIG. 1.

In FIG. 3, the software configuration in the information processing device 210 includes a sleep control module 310, an IPsec control module 308, an IPsec processing module 309, a life time correcting module 311, and a CPU-to-CPU communication module 307.

The sleep control module 310 controls a switching operation between the normal power mode (first power mode) and the power saving mode (second power mode) in which power consumption is smaller than that in the normal power mode. The IPsec processing module 309 performs a negotiation process for acquiring information required for executing IPsec communication, and a process for encrypting and decrypting a packet transmitted to and received from the external apparatus.

The IPsec control module 308 (first management unit) controls the IPsec processing module 309, holds the information that is needed when the IPsec processing module 309 performs the process about the IPsec, and manages life time information of the IPsec. The CPU-to-CPU communication module 307 transmits and receives the software running on the NIC device 220 and data via the extended I/F 212 and the extended I/F 222.

When returning to the normal power mode from the power saving mode, the life time correcting module 311 (correction unit) corrects a difference yielded in the SA information. Although this example corrects the difference based on an RTC (Real Time Clock) and an SNTP (Simple Network Time Protocol), methods other than the RTC and the SNTP can be used as long as time can be acquired in real time.

On the other hand, the software configuration in the NIC device 220 includes a proxy response module 301 (proxy communication unit), an IPsec transmitting process library 302, an IPsec control module 303, an IPsec processing module 304, a network I/F control unit 305, and a CPU-to-CPU communication module 306.

The CPU-to-CPU communication module 306 transmits and receives the software running on the information processing device 210 and data via the extended I/F 222 and the extended I/F 212.

The IPsec processing module 304 performs a process for encrypting and decrypting a packet transmitted to and received from the external apparatus. It should be noted that the IPsec processing module 304 is not provided with a negotiation function for acquiring information required for executing the IPsec communication, unlike the IPsec processing module 309. However, the IPsec processing module 304 may have the same configuration as the IPsec processing module 309. The IPsec control module 303 (second management unit) controls the IPsec processing module 304, holds the information that is needed when the IPsec processing module 304 performs the process about the IPsec, and manages the life time information of the IPsec.

The network I/F control unit 305 controls transmission and reception of the packet by the network I/F 225. It should be noted that the network I/F control unit 305 always grasps which of the normal power mode and the power saving mode is selected during the operation of the information processing device 210. Then, the network I/F control unit 305 transmits the packet received from the LAN1 20 to the information processing device 210, when the information processing device 210 operates in the normal power mode. On the other hand, the network I/F control unit 305 transmits the packet received from the LAN1 20 to the IPsec processing module 304, when the information processing device 210 operates in the power saving mode.

The proxy response module 301 receives the incoming packet transmitted from the IPsec processing module 304 during operation in the power saving mode. Since the IPsec processing module 304 receives a packet only when the information processing device 210 operates in the power saving mode, the proxy response module 301 also operates in this case only.

The proxy response module 301 classifies the received packets into three types. The three types are a "packet to be canceled", a "packet to be transmitted to the information processing device 210", and a "packet to be responded by proxy". The "packet to be canceled" may be disregarded (unnecessary to respond) because the packet is not addressed to the device itself. When a received packet is classified into this type, the packet is canceled.

The "packet to be transmitted to the information processing device 210" needs to be processed by the information processing device 210. That is, the NIC device 220 cannot apply the necessary process to the packet solely. When such a packet is received, the proxy response module 301 returns the information processing device 210 to the normal power mode from the power saving mode, and transmits the received packet to the information processing device 210.

The NIC device 220 respond to the "packet to be responded by proxy" instead of the information processing device 210. In this case, the proxy response module 301 transmits a response packet, after encrypting it using the IPsec transmitting process library 302.

The IPsec transmitting process library 302 is a module that provides an API (Application Program Interface), and performs, if needed, an encryption process to the packet passed as an IN parameter from the proxy response module 301. Then, the encrypted packet is outputted with an API return value as an OUT parameter.

Figure 4:
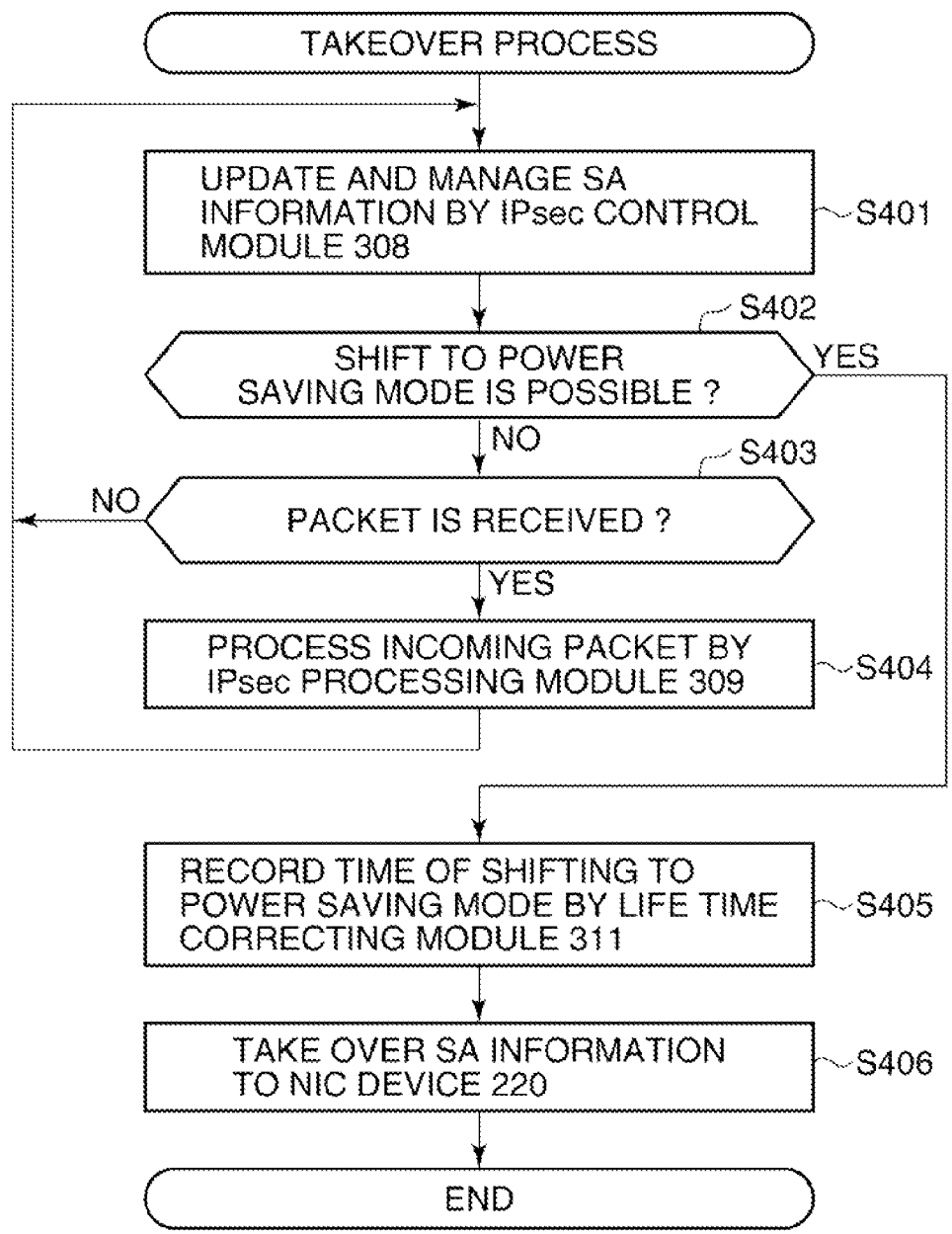
FIG. 4 is a flowchart showing a takeover process for taking over SA information to a NIC device when an information processing device in FIG. 2 shifts to a power saving mode.

FIG. 4 is a flowchart showing a takeover process for taking over SA information to the NIC device 220 when the information processing device 210 in FIG. 2 shifts to the power saving mode.

The takeover process shown in FIG. 4 is executed by the CPU 211 of the information processing device 210.

In the normal power mode, the IPsec control module 308 updates and manages the SA information (step S401). Next, the CPU 211 inquires of software modules registered beforehand whether the modules can shift to a sleep state (the power saving mode) in order to verify whether the modules get into trouble when shifting to the sleep state. Then, the CPU 211 determines whether the shift to the power saving mode is possible (step S402). In this embodiment, the IPsec control module 308 shall be registered as a target inquired about the shift to the sleep state. For example, when the IPsec processing module 308 negotiates with the external apparatus, the shift to the sleep mode becomes "impracticable".

When it is impossible to shift to the power saving mode (NO in the step S402), the CPU 211 determines whether a packet has been received (step S403). When there is no incoming packet (NO in the step S403), the CPU 211 returns the process to the step S401. When there is an incoming packet (YES in the step S403), the CPU 211 processes the incoming packet by the IPsec processing module 309 (step S404), and returns the process to the step S401.

When it is possible to shift to the power saving mode (YES in the step S402), the CPU 211 acquires time just before transmitting the SA information to the NIC device 220 (i.e., shift time when shifting to the power saving mode) by the life time correcting module 311 using the RTC or the SNTP, and records the time into an occupancy area of the life time correcting module in the RAM 214 (step S405). Then, the CPU 211 takes over the SA information from the information processing device 210 to the NIC device 220 by transmitting via the CPU-to-CPU communication module 306 and the CPU-to-CPU communication module 307 (step S406), and terminates the process.

Figure 5:
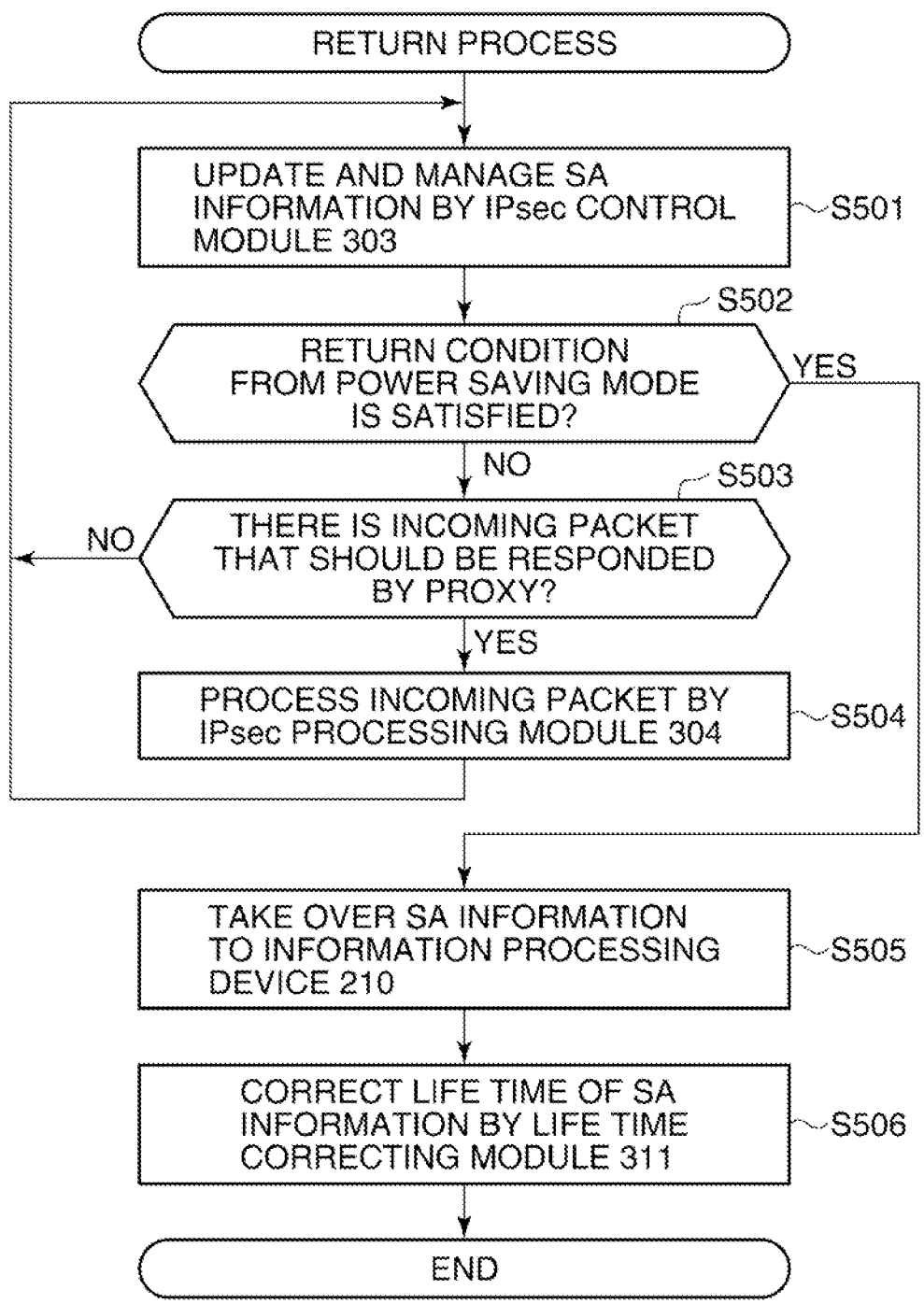
FIG. 5 is a flowchart showing a return process for taking over the SA information from the NIC device when the information processing device in FIG. 2 returns to a normal power mode from the power saving mode.

FIG. 5 is a flowchart showing a return process for taking over the SA information from the NIC device 220 device when the information processing device 210 in FIG. 2 returns to the normal power mode from the power saving mode. A process in steps S501 through S505 of the return process shown in FIG. 5 is executed by the CPU 221 of the NIC device 220, and a process in step S506 is executed by the CPU 211 of the information processing device 210.

In the power saving mode in FIG. 5, the CPU 221 updates and manages the SA information by the IPsec control module 303 (step S501).

Next, the CPU 221 determines whether a return condition is satisfied by comparing the life time of the SA information that is updated and managed by the IPsec control module 308 to the condition for returning from the power saving mode (step S502).

When the return condition is not satisfied (NO in the step S502), the CPU 221 determines whether there is an incoming packet that should be responded by the proxy response module 301 of the NIC device 220 (step S503). The incoming packet that should be responded by proxy has been set to the NIC device 220 by the information processing device 210 before shifting to the power saving mode. When there is no incoming packet that should be responded by proxy (NO in the step S503), the CPU 211 returns the process to the step S501. When there is an incoming packet that should be responded by proxy (YES in the step S503), the CPU 211 processes the incoming packet by the IPsec processing module 304 (step S504), and returns the process to the step S501.

When it is determined that the return condition from the power saving mode is satisfied (YES in the step S502), the CPU 221 takes over the SA information to the information processing device 210 by transmitting the SA information from the NIC device 220 to the information processing device 210 via the CPU-to-CPU communication module 307 and the CPU-to-CPU communication module 306 (step S505). Then, the CPU 211 corrects the life time of the taken-over SA information by the life time correcting module 311 (step S506), and terminates the process.

Figure 6:
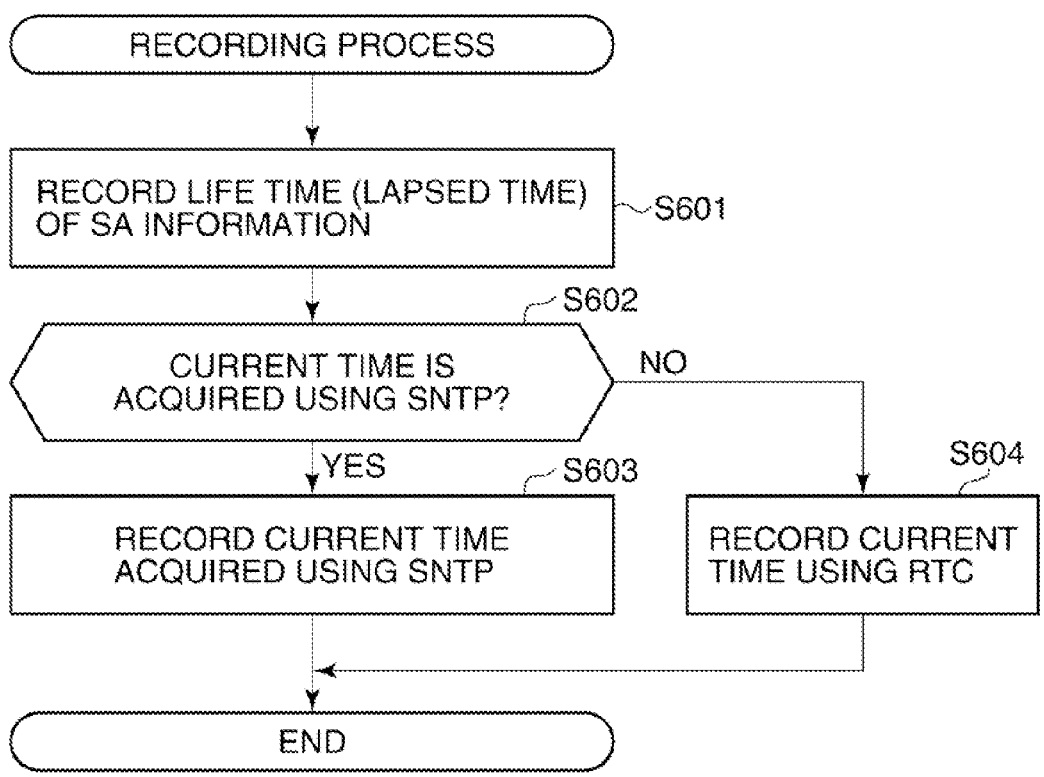
FIG. 6 is a flowchart showing a recording process executed by a life time correcting module when the information processing device in FIG. 2 shifts to the power saving mode from the normal power mode.

FIG. 6 is a flowchart showing a recording process executed by the life time correcting module 311 when the information processing device 210 in FIG. 2 shifts to the power saving mode from the normal power mode.

The flowchart shown in FIG. 6 represents details of the process in the step S405 in FIG. 4.

In FIG. 6, the life time correcting module 311 controls to record the life time (lapsed time, first life time information) of the SA information transmitted to the NIC device 220 into the RAM 214 at the time of the shift to the power saving mode (step S601).

Next, the life time correcting module 311 determines whether the current time is acquired using the SNIP (step S602). When the current time could be acquired using the SNTP (YES in the step S602), the life time correcting module 311 records the acquired time (step S603), and terminates the process. On the other hand, when the current time could not be acquired using the SNIP (NO in the step S602), the life time correcting module 311 records the current time using the RTC in the information processing device 210 (step S604), and terminates the process.

Figure 7:
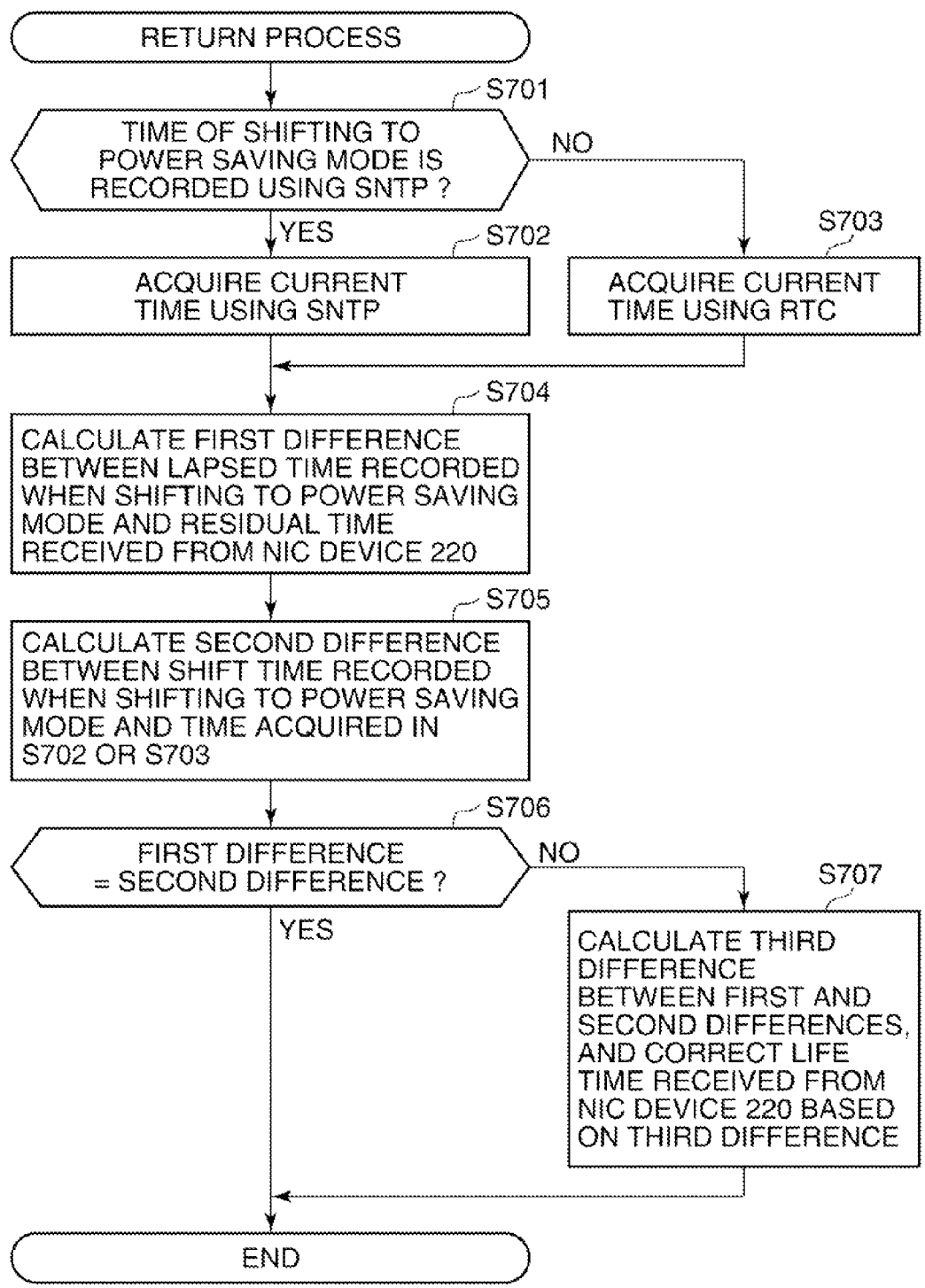
FIG. 7 is a flowchart showing a return process of the life time correcting module when the information processing device in FIG. 2 returns to the normal power mode from the power saving mode.

FIG. 7 is a flowchart showing a return process of the life time correcting module 311 when the information processing device 210 in FIG. 2 returns to the normal power mode from the power saving mode.

The flowchart shown in FIG. 7 represents details of the process in the step S506 in FIG. 5.

In FIG. 7, the life time correcting module 311 determines whether the time of shifting to the power saving mode was recorded using the SNTP at the time returning to the normal power mode (step S701). When the SNTP is used for recording the time of shifting to the power saving mode (YES in the step S701), the life time correcting module 311 acquires the current time using the SNIP (step S702), and proceeds with the process to step S704. On the other hand, when not using the SNIP (NO in the step S701), the life time correcting module 311 acquires the current time using the RTC (step S703), and proceeds with the process to step S704.

Next, the life time correcting module 311 calculates a first difference between the lapsed time recorded when shifting to the power saving mode and the residual time that is represented by the life time of the SA information (second life time information) received from the NIC device 220 (step S704). In details, since the residual time settles the lapsed time, the life time correcting module 311 calculates a difference between the lapsed time and the lapsed time recorded when shifting to the power saving mode.

Then, the life time correcting module 311 calculates a second difference between the shift time recorded when shifting to the power saving mode and the time acquired in either the step S702 or the step S703 (step S705).

Next, the life time correcting module 311 determines whether the first and second differences calculated in the step S704 and the step S705 are equal (step S706). When the first and second differences are equal (YES in the step S706), the life time correcting module 311 terminates the process without correcting the life time of the SA information. On the other hand, when these differences differ (NO in the step S706), the life time correcting module 311 calculates a third difference between the first and second differences calculated in the step S704 and the step S705, corrects the residual time of the life time received from the NIC device 220 using the third difference (step S707), and terminates the process.

According to the processes in FIG. 4 through FIG. 7, when shifting to the operation by the saving power from the operation by the normal power, the shift time at the time of the shifting and the first life time information managed by the IPsec control module 308 at the shift time concerned are stored into the RAM 214. When returning to the operation by the normal power from the operation by the saving power, the second life time information managed by the IPsec control module 303 is corrected based on the return time at the time of the returning, the second life time information in the return time concerned, the shift time stored in the RAM 214, and the first life time information. This enables the communication even when the IPsec time information is taken over.

Next, a second embodiment will be described. The second embodiment describes the correcting process for the life time when a connection (SA) between communication apparatuses of the same kind exists.

Figure 8:
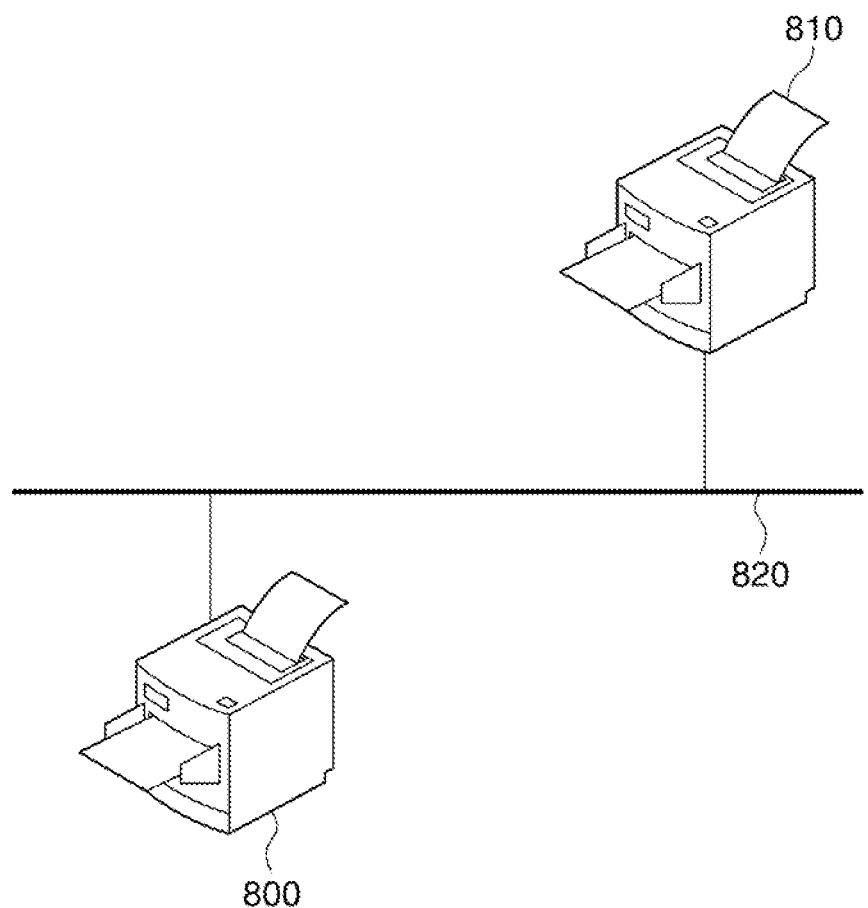
FIG. 8 is a view showing an entire configuration of a network system including a communication apparatus according to a second embodiment of the present invention.

FIG. 8 is a view showing an entire configuration of a network system including a communication apparatus 800 according to the second embodiment of the present invention.

The communication apparatus 800 and a communication apparatus 810 are connected via a LAN 820 so as to communicate mutually. Each of the communication apparatuses 800 and 810 has the same system configuration and is provided with a configuration for executing an IPsec communication. Then, the IPsec shall be applied to all communications between the communication apparatuses 800 and 810. It should be noted that the communication apparatuses 800 and 810 shall have the hardware configuration and software configuration similar to that of the communication apparatus 100 in the first embodiment. Therefore, the second embodiment will be described also with reference to FIG. 2 and FIG. 3.

Figure 9:
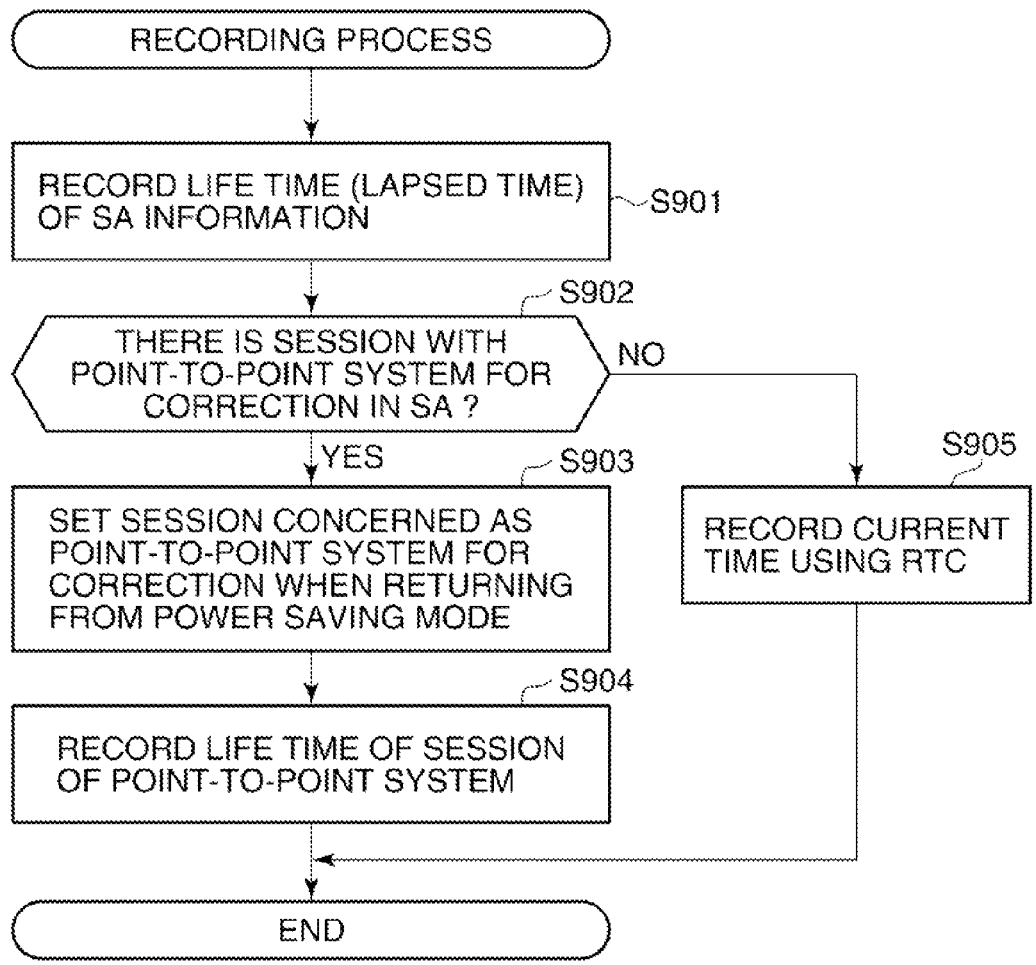
FIG. 9 is a flowchart showing a recording process of a life time correcting module when the information processing device shifts to the power saving mode from the normal power mode.

FIG. 9 is a flowchart showing a recording process of the life time correcting module 311 when the information processing device 210 shifts to the power saving mode from the normal power mode.

In FIG. 9, the life time correcting module 311 records the life time (lapsed time) of the SA information transmitted to the NIC device 220 at the time of the shift to the power saving mode (step S901).

Next, the life time correcting module 311 determines whether there is a session with a communication apparatus under communication used as a point-to-point system for correction in the SA to be held (step S902). When a session exists (YES in the step S902), the life time correcting module 311 sets the session concerned as the point-to-point system (the communication apparatus 810, in this example) for the correction when returning from the power saving mode (step S903), acquires the life time from the set-up point-to-point system, records the life time (step S904), and terminates the process. That is, the life time information acquired from the partner device (the communication apparatus 810, in this example) is stored into the RAM 214 in the second embodiment, instead of the first life time information managed by the IPsec control module 308 in the first embodiment.

On the other hand, when the session concerned does not exist (NO in the step S902), the life time correcting module 311 records the current time using the RTC in the information processing device 210 (step S905), and terminates the process.

Figure 10:
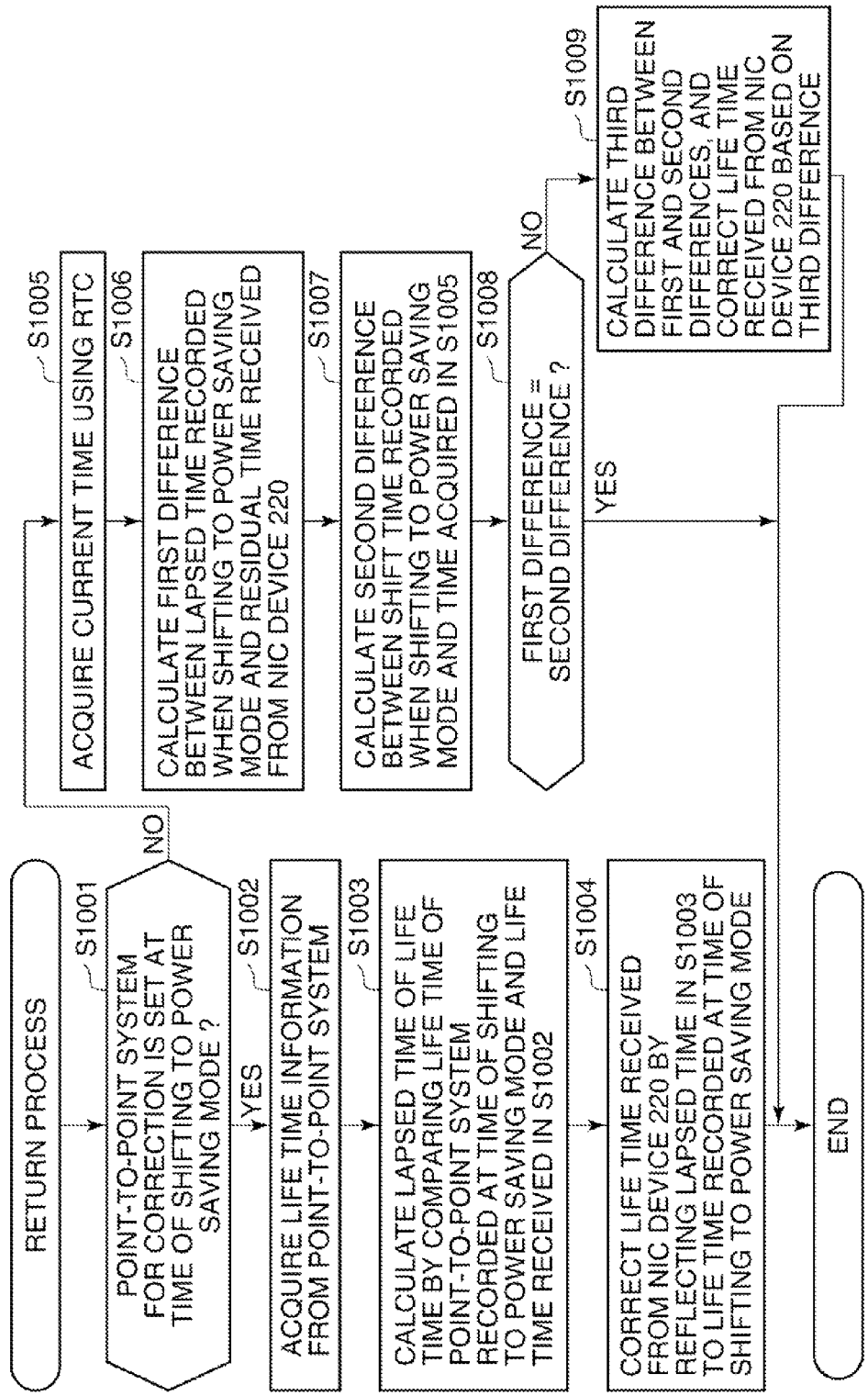
FIG. 10 is a flowchart showing a return process of the life time correcting module when the information processing device returns to the normal power mode from the power saving mode.

FIG. 10 is a flowchart showing a return process of the life time correcting module when the information processing device 210 returns to the normal power mode from the power saving mode.

In FIG. 10, the life time correcting module 311 determines whether a point-to-point system for correction is set at the time of shifting to the power saving mode when returning to the normal power mode (step S1001). When the point-to-point system is set at the time of shifting to the power saving mode (YES in the step S1001), the life time correcting module 311 acquires the life time of the SA of the point-to-point system at the return time from the point-to-point system (step S1002). Next, the life time correcting module 311 calculates the lapsed time of the life time in the power saving mode by comparing the life time of the point-to-point system recorded at the time of shifting to the power saving mode and the life time received from the point-to-point system in the step S1002 (step S1003). Then, the life time correcting module 311 reflects the lapsed time of the life time in the power saving mode to the life time of the SA information recorded at the time of shifting to the power saving mode, replaces the life time received from the NIC device 220, corrects the life time of the SA information (step S1004), and terminates the process.

On the other hand, when a point-to-point system is not set (NO in the step S1001), the life time correcting module 311 acquires the current time using the RTC (S1005).

Next, the life time correcting module 311 calculates a first difference between the residual time of the life time recorded at the time of shifting to the power saving mode and the residual time of the life time of the SA information received from the NIC device 220 (step S1006). In details, since the residual time settles the lapsed time, the life time correcting module 311 calculates a difference between the lapsed time and the lapsed time recorded when shifting to the power saving mode.

Then, the life time correcting module 311 calculates a second difference between the shift time recorded when shifting to the power saving mode and the time acquired in the step S1005 (step S1007).

Next, the life time correcting module 311 determines whether the first and second differences calculated in the step S1006 and the step S1007 are equal (step S1008). When the first and second differences are equal (YES in the step S1008), the life time correcting module 311 terminates the process without correcting the life time of the SA information. On the other hand, when these differences differ (NO in the step S1008), the life time correcting module 311 calculates a third difference between the differences calculated in the step S1006 and the step S1007, corrects the residual time of the life time received from the NIC device 220 using the third difference (step S1009), and terminates the process.

Thus, in the process in FIG. 10, the second life time information is corrected based on the life time information at the return time that is received from the partner device (the communication apparatus 810, in this example), in place of the second life time information managed by the IPsec control module 303 in the first embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-093958, filed on Apr. 20, 2011, which is hereby incorporated by reference herein in its entirety.

What is claimed is:

1. A communication apparatus, having a network interface device, that is capable of executing IPsec communication through the network interface device with an external apparatus on a network, the communication apparatus comprising:
a memory device;
a processor;
a notification unit configured to notify the network interface device of SA information used for executing the IPsec communication, in a case where the communication apparatus shifts from a first power mode to a second power mode having less power consumption than the first power mode;
an acquisition unit configured to acquire, from the network interface device, the SA information, during a shift of the communication apparatus from the second power mode to the first power mode; and
a correction unit configured to correct a life time included in the SA information acquired by the acquisition unit, the correction of the life time included in the SA information occurring upon the communication apparatus shifting from the second power mode to the first power mode and before a subsequent shift from the first power mode to the second power mode,
wherein the notification unit, the acquisition unit, and the correction unit are implemented by the processor executing at least one program recorded on the memory device.

2. The communication apparatus according to claim 1, wherein the correction unit corrects the life time based on a lapsed time during which the communication apparatus operates in the second power mode.

3. The communication apparatus according to claim 1, wherein the correction unit corrects the life time based on a difference between a first time of the notification unit notifying the network interface device of the SA information and a second time of the acquisition unit acquiring the SA information from the network interface device.

4. A control method for a communication apparatus, having a network interface device, that is capable of executing IPsec communication through the network interface device with an external apparatus on a network, the method comprising:
notifying the network interface device of SA information used for executing the IPsec communication, in a case where the communication apparatus shifts from a first power mode to a second power mode having less power consumption than the first power mode;
acquiring, from the network interface device, the SA information, during a shift of the communication apparatus from the second power mode to the first power mode; and
correcting a life time included in the acquired SA information upon the communication apparatus shifting from the second power mode to the first power mode and before a subsequent shift from the first power mode to the second power mode.

5. A non-transitory computer-readable storage medium storing a control program causing a computer to execute a control method for a communication apparatus, having a network interface device, that is capable of executing IPsec communication through the network interface device with an external apparatus on a network, the method comprising:
notifying the network interface device of SA information used for executing the IPsec communication, in a case where the communication apparatus shifts from a first power mode to a second power mode having less power consumption than the first power mode;
acquiring, from the network interface device, the SA information, during a shift of the communication apparatus from the second power mode to the first power mode; and
correcting a life time included in the acquired SA information upon the communication apparatus shifting from the second power mode to the first power mode and before a subsequent shift from the first power mode to the second power mode.

6. The communication apparatus according to claim 1, wherein the correction unit determines a first difference between a life time included in the SA information notified to the network device and the life time included in the SA information acquired by the acquisition unit and a second difference between a time when the communication apparatus shifts from the first power mode to the second power mode and a time when the communication apparatus shifts from the second power mode to the first power mode, and
wherein the correction unit does not correct the lifetime included in the acquired SA information when the first difference equals the second difference.

7. The communication apparatus according to claim 6, wherein the correction unit corrects the lifetime included in the acquired SA information when the first difference does not equal the second difference.

8. The communication apparatus according to claim 7, wherein the correction unit corrects the lifetime included in the acquired SA information based on a third difference between the first difference and the second difference.

9. The communication apparatus according to claim 1, wherein an information processing device includes the processor, the information processing device further including a first interface connected with a second interface of the network interface device to enable data communication between the information processing device and the network interface device, and a third interface connected with an operation unit, a printer, or a scanner,
wherein in the second power mode, power supply to the processor of the information processing device is stopped while power is supplied to the network interface device.

10. The communication apparatus according to claim 1, wherein an information processing device includes the processor, the information processing device further including a first interface connected with a second interface of the network interface device to enable data communication between the information processing device and the network interface device, and a third interface connected with an operation unit, a printer, or a scanner, wherein in the second power mode, upon receipt of a first type packet, the network interface device processes the first type packet without causing the information processing device to return to the first power mode, and upon receipt of a second type packet, the network interface device causes the information processing device to return to the first power mode and transmits the second type packet to the information processing device.

* * * * *